United States Patent [19]
Snyder

[11] 4,182,534
[45] Jan. 8, 1980

[54] DIRECTIONAL CONTROL VALVE SYSTEM

[76] Inventor: David M. Snyder, 4008 N. Lancaster Dr., Muncie, Ind. 47304

[21] Appl. No.: 816,061

[22] Filed: Jul. 15, 1977

[51] Int. Cl.² ................................................ B60P 1/14
[52] U.S. Cl. .................................... 298/22 C; 60/403; 137/596.14
[58] Field of Search ............. 298/22 C, 22 R; 60/403; 137/596.14, 565

[56] References Cited

U.S. PATENT DOCUMENTS

| | | | |
|---|---|---|---|
| 2,397,736 | 4/1946 | Hadekel | 137/565 X |
| 2,403,391 | 7/1946 | Muir | 60/377 |
| 3,079,946 | 3/1963 | Rosler | 137/859 X |
| 3,452,779 | 7/1969 | Klessig | 137/596.14 |

FOREIGN PATENT DOCUMENTS 362930  8/1962  Switzerland ........................... 298/22 C

*Primary Examiner*—Stephen G. Kunin
*Assistant Examiner*—George F. Abraham

[57] ABSTRACT

A system particularly useful in trucks for manipulating a hydraulically operated work station comprising a network of four intercommunicating directional valves including a primary valve directing the flow to or from the work station and located between the work station, a hydraulic fluid pump and a fluid reservoir. The valve is designed so that when in the hold position fluid is continuously circulated from the reservoir through the pump and valve and movement of the work station is prohibited. The primary valve is normally biased to its hold position and is air actuated to its work or return position by an operational valve manipulated by a safety manual control. The operational valve directs air to the work or return side of the primary valve which is provided with free floating pistons for adjusting the primary valve spool in response to the flow of air in a surrounding chamber. The chambers and valve housing cooperate to fully seal the spool against contamination. Located in the air line on the work side between the primary and operational valve is a limit valve which senses the point of maximum desired travel of the work station and automatically returns the operational valve to its hold position as that point is reached. A safety valve is provided when desirable at the source of air pressure to protect the source if air pressure is lost in the system. When actuated by the loss of air pressure below a predetermined amount, the safety valve stops air flow to the operational valve which shifts the system automatically to neutral.

61 Claims, 13 Drawing Figures

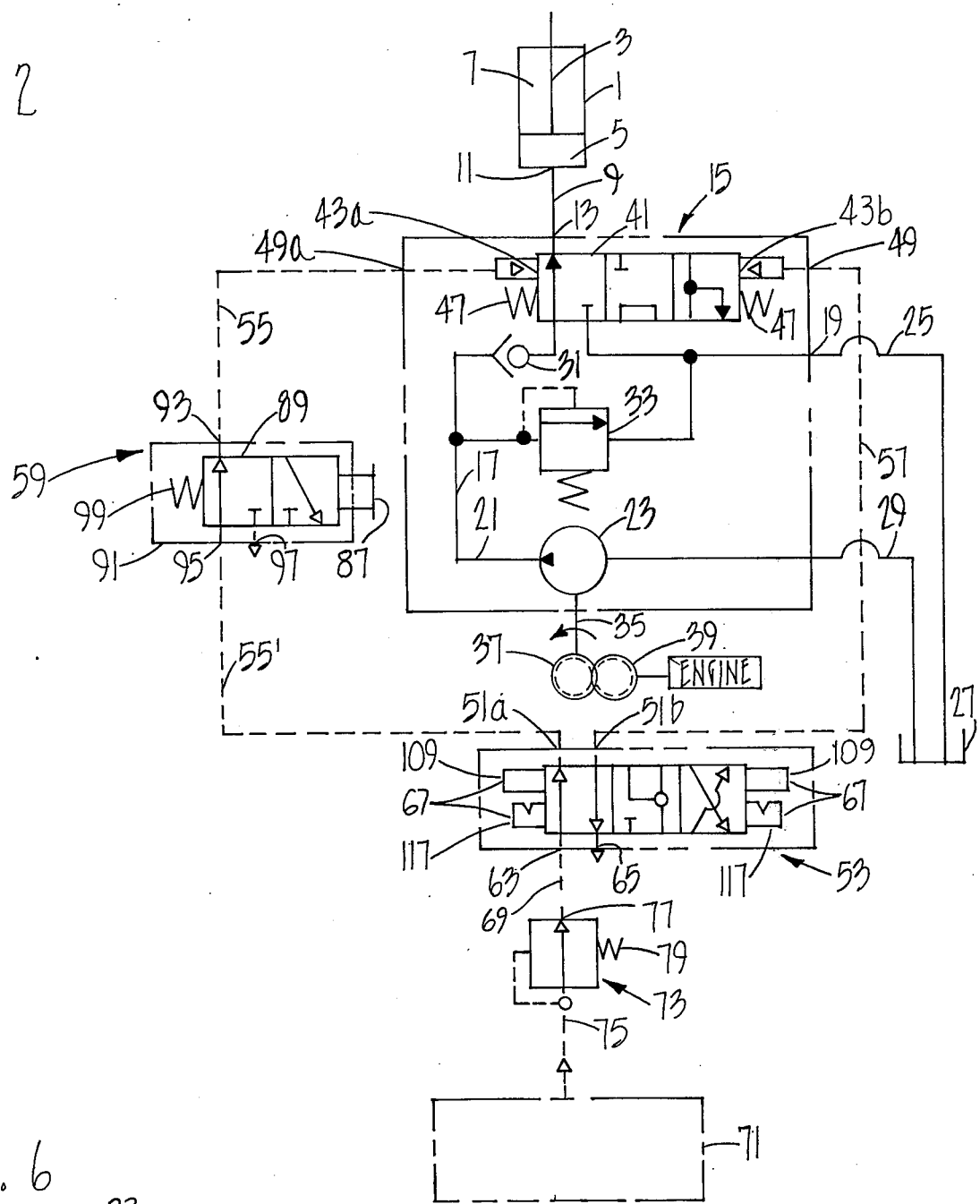
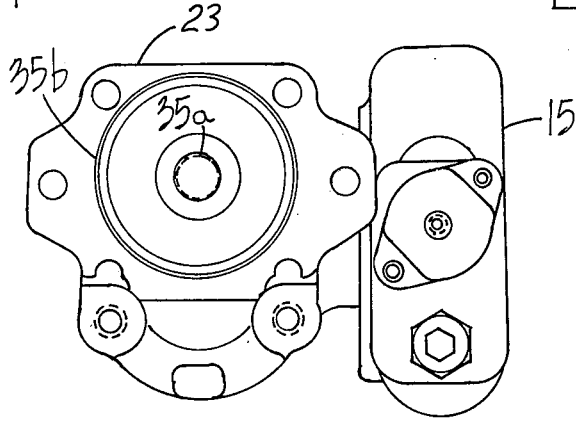

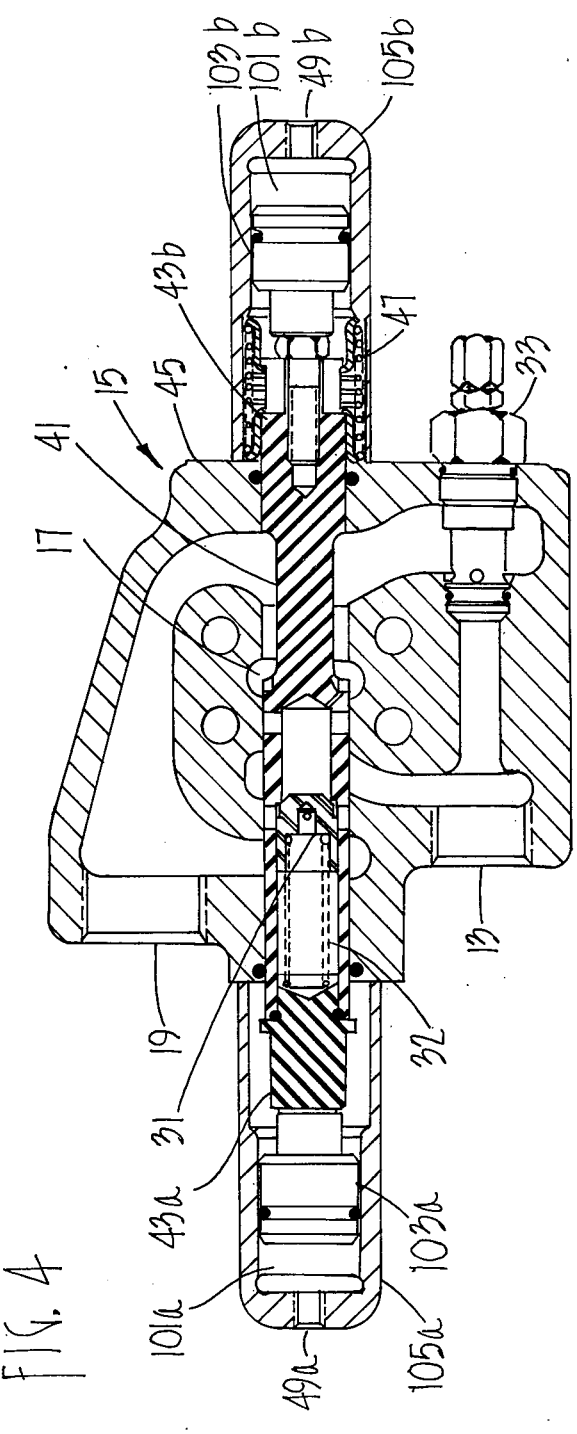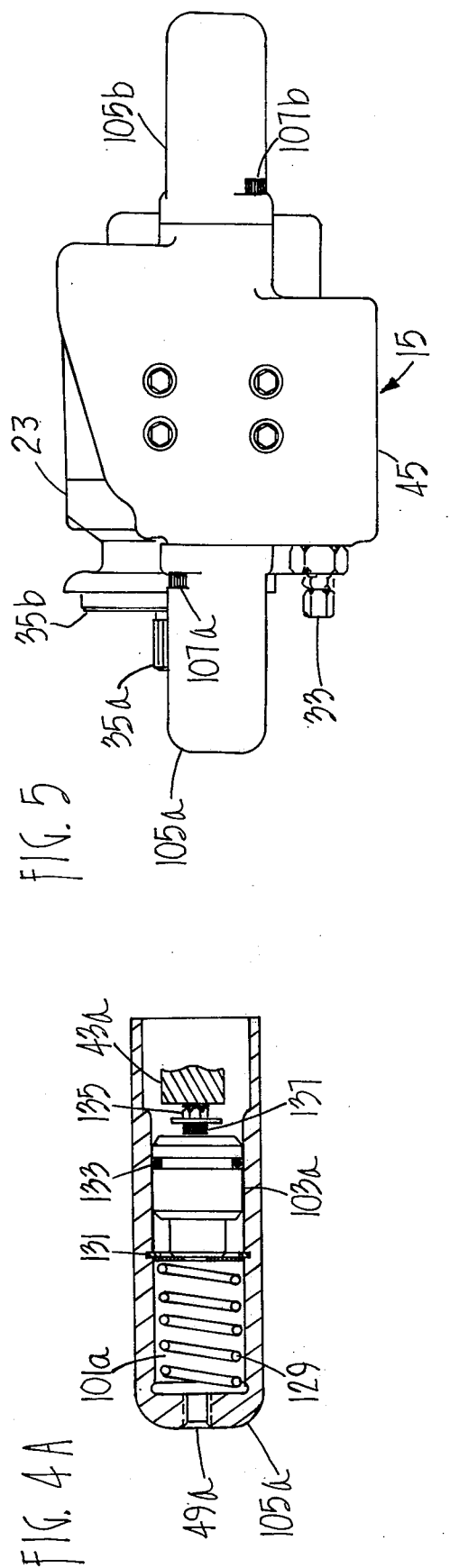

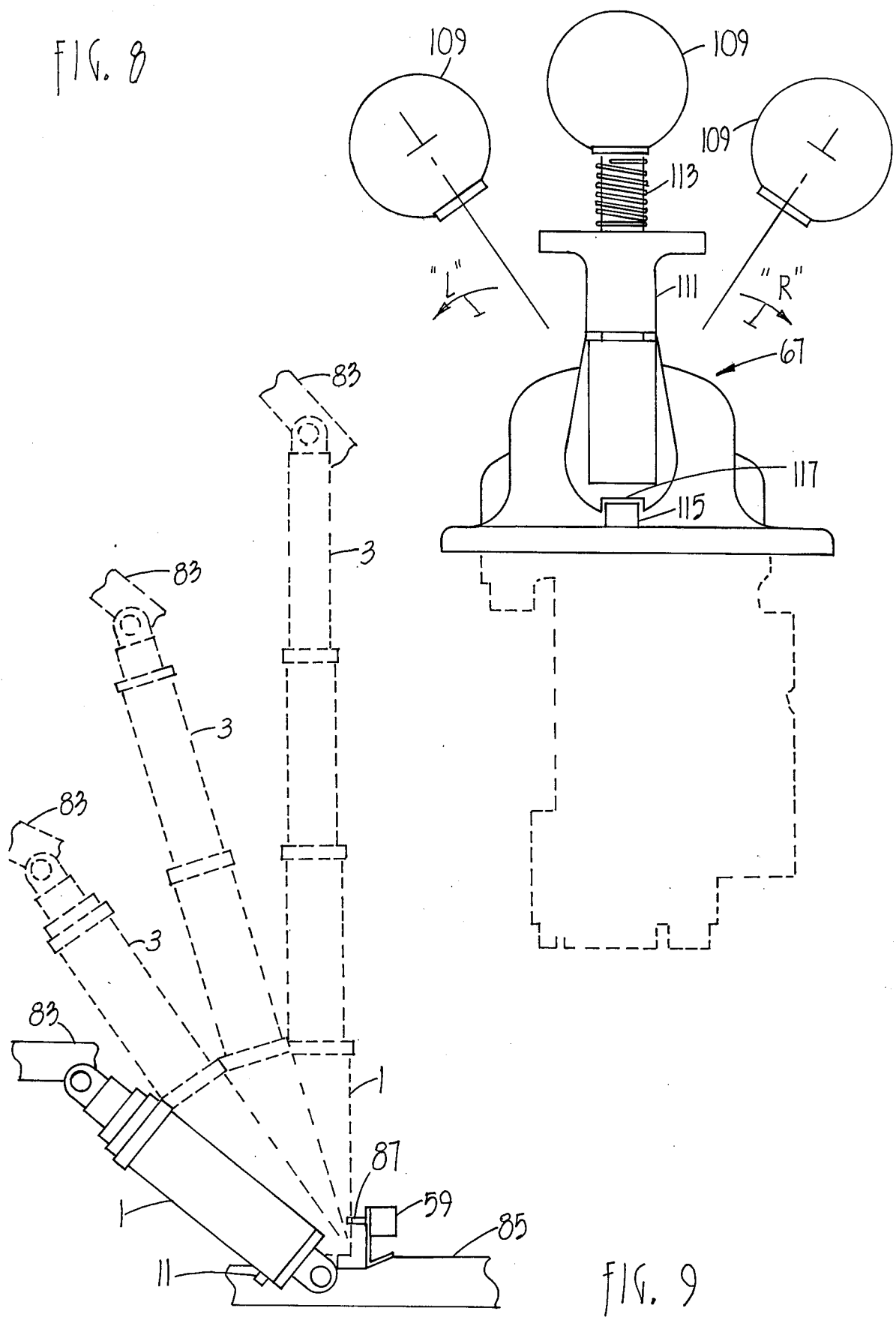

DIRECTIONAL CONTROL VALVE SYSTEM

This invention relates to a hydraulic valve system for operating a work station. More particularly this invention relates to an improved safety system especially useful for airoperating a hydraulically actuated truck part or accessory.

Hydraulically operated work stations requiring actuating and regulatory systems are prevelant throughout many industries. Heavily reliant upon the use of such stations are those industries which require trucks (or other power driven vehicles) to perform such work. Exemplary of such work stations (i.e., parts or accessories) associated with trucks are dump bodies raised and lowered by hydraulic hoists, lift gates, aerial ladders, winches, drills, and numerous other devices.

Generally such parts or accessories are operated by converting the rotary power of the truck transmission into energy useful to operate a hydraulic pump which in turn provides hydraulic fluid via a valve network to the work station. The conversion process is usually accomplished by a separate attachment to the transmission called a power take-off which is comprised of a gear mechanism that properly converts the power from transmission to pump. At times the pump may be remotely connected to the power take-off device via an interconnecting rotating shaft or at times may be directly mounted to the power take-off. Means for engaging and disengaging the power take-off and transmission are conventionally provided.

Hydraulic pumps useful for pumping the fluid are well known and are available in a variety of models. Mountable on these pumps is a wide variety of directional control valves. Such valves usually include a directional spool valve which in combination with the lands and grooves in the valve housing create the desired, selective fluid flow path. Usually one end of the spool extends beyond the valve housing. The exposed end of the spool is then connected to a rod or lever which in turn is connected to a handle in the cab of the truck. When the handle is moved, the lever or rod causes the spool to shift to create the desired fluid flow path. In the case of a dump body, for example, the spool created path would raise, lower or hold the dump body. Lowering may be by gravity (exhaust) or by a power-down work performance. A few attempts have been made to air rather than manually actuate the exposed single end of the spool. In such cases, where successfully accomplished, the spool end has still remained substantially exposed. Attempts to fully enclose the single spool end have not proved successful.

Exposure of the spool end to the contaminated environment, such as the underbelly of a truck, results in spool contamination and ultimately to valve and pump damage. The use of a rod or lever at the spool end presents safety problems since such can become an enticement for the careless operator to use to actuate the work station if the handle fails. Use of the rod or lever to perform work may place the operator in the way of the work being performed or in the path of the rotating remote shaft extending between the power take-off and pump. Inadvertent contact with the lever, rod or connecting cable which runs to the handle can cause undesired and unexpected actuation of the work station.

Many directional valves do not allow for continuous use, in that in the hold position while prohibiting flow from the work station, they do not provide for continuous circulation of the fluid from reservoir to pump to valve and back to reservoir, thus causing the valve to overheat and bind if held in the hold position too long. This is a significant problem in the dump body situation where the body must be held in a raised position for a considerable period of time. Attempts to overcome this by providing for continuous circulation have generally necessitated the addition of temporary attachments, inserts or lines which are subject to removal and damage.

At certain times it is important to have within the system a mechanism for limiting the amount of work (e.g., the extent of travel) performed by the work station. For example, in a dump body-cylinder hoist combination, substantial damage might be done or danger occur if the dump angle and/or cylinder extension were not limited. Limiting cylinder or other work station travel has conventionally been accomplished by either building the cylinder to have an internal stop or by providing a pull cable extending from the valve spool to the body such that at the point of maximum desired lift, the cable tightens and pulls the spool into its hold position. Such valves, however, usually provide the "lower" position right after the hold position. All too often the cable has inadvertently been pulled, usually by a person working under the raised body, too far so that the spool is adjusted through hold to the lower position resulting in the unexpected dropping of the body.

Some valves, while providing a plurality of positions, do not provide for a separate hold position; others, while providing for a hold position, do not bias to hold. Thus, in an emergency, the raised or other potentially dangerous work position is not frozen but capable of movement of cause damage or injury.

In devices which employ air shift arrangements, most draw their air from the air-brake line system. Failure to provide a safety means for protecting the brake-line system from loss of air pressure due to a leak in the work operating system can give rise to a significant highway safety problem.

It is apparent from the above that there exists a need in the art for a system which can safely control and operate a hydraulically actuated work station while effectively overcoming the above-described problems in the art. It is a purpose of this invention to fill this need as well as other needs apparent to the skilled artisan once given the following description of this invention.

Generally speaking this invention provides a mechanism for directing the flow of hydraulic fluid between a work station operable by said fluid and a pump for supplying the fluid under pressure from a fluid reservoir to operate said work station, the mechanism comprising a first valve means for selectively directing the flow of hydraulic fluid under pressure in at least two predetermined paths between a fluid pump port, a fluid work station port and a fluid reservoir port, one of these paths directing fluid from the pump port to the work station port while prohibiting flow to the reservoir port, and another path directing fluid between the pump port and reservoir port while retaining the work station in a hold position by prohibiting flow of fluid to or from the work station port, the first valve comprising a first valve housing having said ports therein, a valve spool capable of being slidably adjusted within the first valve housing for the selected creation of the fluid flow paths, a piston located at one end of the spool and in communication with the spool end, a biasing means for normally retaining the spool in one of said positions, chamber means in communication with the piston at the end of the piston opposite that in communication with the spool end and provided with a chamber port means, the valve housing and chamber means cooperating to enclose the valve spool in all of its positions, and a second valve means for selectively controlling the actuation of the first valve means, the second valve housing having located therein an air inlet port, an air exhaust port and an air outlet port, conduit means for connecting the air outlet port to the chamber port means and means operably located in the flow paths connecting the inlet, exhaust and outlet ports to direct the air in a preselected path thereby to adjust the valve spool to create a desired fluid flow path.

In another mode the invention provides a mechanism for directing the flow of hydraulic fluid between a work station operable by the fluid and a pump for supplying the fluid under pressure from a fluid reservoir to operate the work station, the mechanism comprising a first valve means for selectively directing the flow of hydraulic fluid under pressure in at least three predetermined paths between a fluid pump port, a fluid work station port and a fluid reservoir port, one of the paths directing fluid from the pump port to the work station port while prohibiting flow to the reservoir port, one of the paths directing fluid between the pump port and reservoir port while retaining the work station in a hold position by prohibiting flow of fluid to or from the work station port, and one of the paths directing flow of the fluid from the work station port and the pump port to the reservoir port, the first valve comprising a first valve housing having said ports therein, a first valve spool capable of being slidably adjusted within the first valve housing for the selective creation of the fluid flow paths, a first valve piston located at either end of the spool and in communication with the spool ends, a biasing means for normally retaining the first spool in the hold position, chamber means in communication with each of the first valve pistons at the end of the piston opposite that in communication with the spool end and provided with chamber port means for admitting air into and releasing air from the chamber, and a second valve means for selectively controlling the actuation of the first valve means, the second valve means comprising a second valve housing having located therein a first air inlet port, a first air exhaust port and a pair of first air outlet ports, means for connecting each of the first air outlet ports to a respective chamber port means in the first valve, and means operatively located in the flow paths connecting the first inlet, first exhaust and first outlet ports to direct the flow of air in a selective path between the ports thereby to adjust the first valve spool to a position which creates the desired fluid flow path.

In certain preferred embodiments such mechanisms further include a means for sensing a loss of air pressure in the mechanism and in response thereto shut off the first air inlet port. Such mechanisms may preferably provide a sensing and shut-off means which comprises a third valve means which includes a housing having therein a second air inlet port and a second air outlet port, the second air outlet port being in communication with the first air inlet port, and further including a shut-off device located between the second inlet and the second outlet ports.

In certain other preferred embodiments such mechanisms may include alone or in addition to said sensing and shut-off means, a means for sensing a predetermined amount of work performed by the work station and in response thereto actuating the first valve to its hold position. In preferred embodiments these predetermined work sensing means may comprise a valve housing having therein a second air inlet port, a second air exhaust port, a second air outlet port, and a second valve spool slidably located within the flow paths of the second ports and having one end extending beyond the extremities of the valve housing for sensing the predetermined amount of work, the second inlet port communicating with one of the first outlet ports of the second valve and the second outlet port communicating with one of the chamber port means of the first valve.

The mechanism and systems of this invention find particular advantageous use in operating hydraulically actuated truck parts and accessories such as hoists for dump bodies, lift gates, winches, aerial ladders and the like. Indeed, it is in this environment where the mechanism and systems may be used to distinct advantage to provide improved safety, longer pump and valve life and general overall increased effectiveness than heretofore achieved. In this respect these unique mechanisms are systems are adaptable to a wide variety of conventional configurations such as remote or directed mounted power take-off pump combinations, various power take-off models allowing for manual or air-operated engagement or disengagement from the transmission, and the like. Unique features such as the full enclosure of the spool to prevent contamination, safety locks, automatic biasing to hold position, selective control of the rate of flow of the fluid to or from the work station, and the various limiting and sensing means present a system well within state and federal safety regulations and state-of-the-art guidelines covering the trucking industry.

This invention will now be described with respect to certain embodiments and the accompanying illustrations, wherein:

IN THE DRAWINGS

FIG. 2 is a schematic diagram of the embodiment of FIG. 1, the system being shown in the "raise"0 position.

FIG. 4 is a side partially sectionalized view of a hydraulic fluid directional valve according to this invention.

FIG. 4a is a side partially sectionalized view of a spool-chamber combination of this invention.

FIG. 5 is a side plan view of the valve of FIG. 4 mounted to a hydraulic fluid pump.

FIG. 6 is a front plan view of FIG. 5.

FIG. 8 is a front plan, partially schematized view of the operational valve and manual control shown in FIG. 6.

FIG. 9 is a side plan, action view of a hoist and dump body in its various positions, with a limit valve in place.

Figure 1:
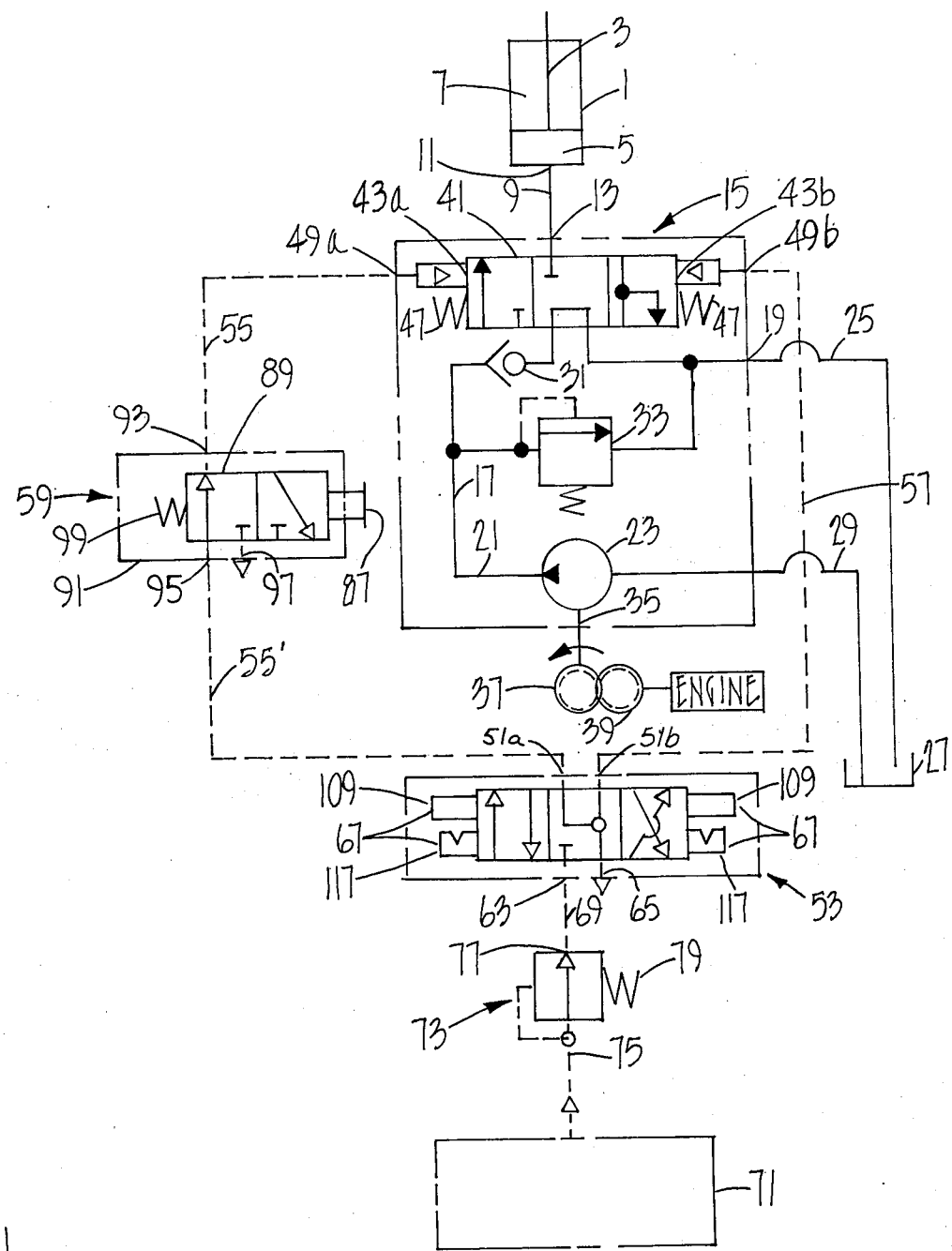
FIG. 1 is a schematic diagram of one embodiment of a system of this invention, the system being shown in the "hold" position.
Figure 11:
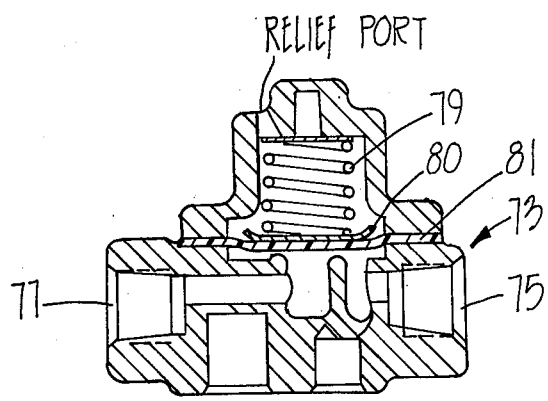
FIG. 11 is a side sectional view of an air pressure safety valve useful in the practice of this invention.
Figure 3:
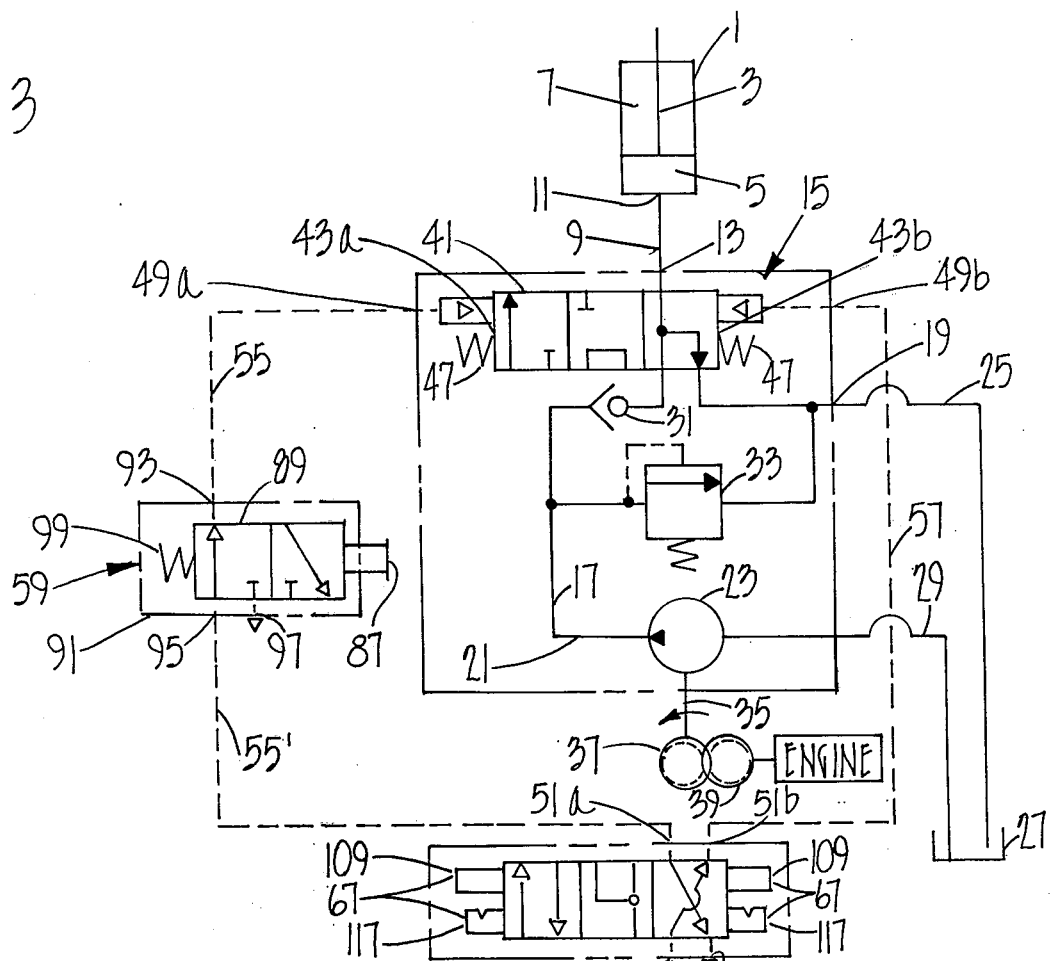
FIG. 3 is the schematic diagram of the embodiment of FIG. 1, the system being shoen in the "lower" position.
Figure 10:
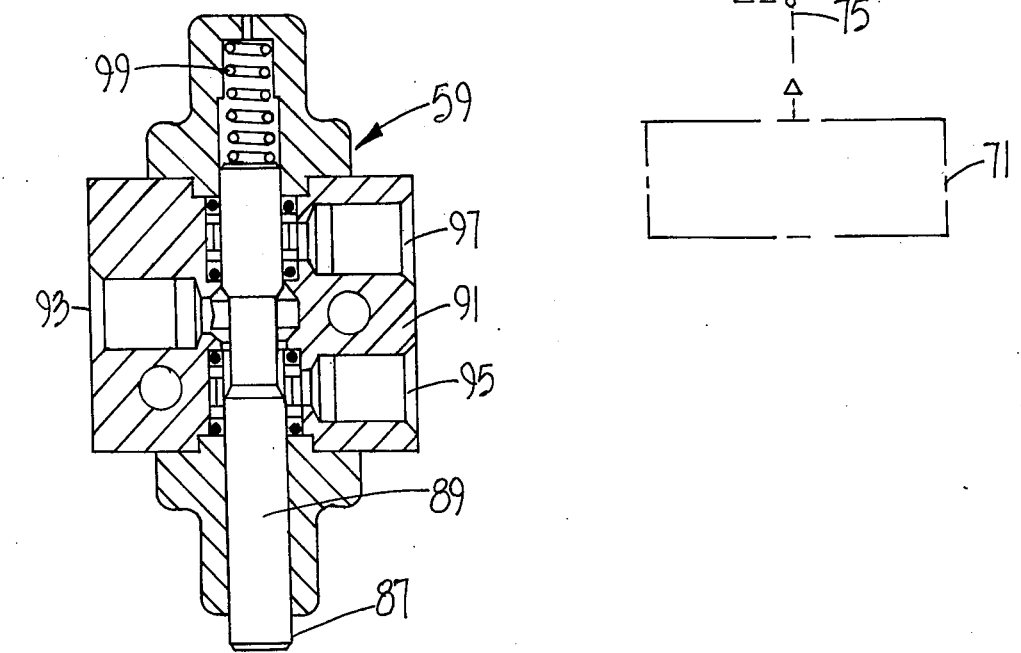
FIG. 10 is a side sectional view of a limit valve as shown in FIG. 9.

FIGS. 1–3 illustrate the general components and operation of a mechanism and system according to this invention. Work station 1 in this instance is illustrated as a hydraulic cylinder raisable at portion 3 by admission of hydraulic fluid into cylinder chamber 5 and lowerable by exhausting the fluid from chamber 5. While this embodiment illustrates a power-up system only since portion 3 is lowerable by gravity exhaustion of fluid from chamber 5, it is understood that the systems of this invention may also be designed to effect a power-down situation where fluid is admitted to chamber 7 while exhausting it from chamber 5.

Hydraulic line 9 connects the fluid port 11 of work station 1 with the fluid work station port 13 of directional valve 15.

Directional valve 15 is provided with an inlet port 17 and a return (outlet or exhaust) port 19. In the preferred embodiments outlet port 21 of pump 23 is directly manifolded to inlet port 17. In other embodiments port 21 may be manifolded to hydraulic line 21 which remotely connects valve 15 with hydraulic pump 23. Hydraulic line 25 connects return port 19 with fluid reservaoir tank 27. A particularly advantageous reservoir tank for the purposes of this embodiment is shown in U.S. Pat. No. 3,683,197. Hydraulic line 29 connects reservoir 27 with pump 23.

Located in valve 15 and between inlet port 17 and work port 13 is check valve 31. Also located in valve 15, between work port 13 and return port 19 is pressure relief valve 33.

Pump 23 is either remotely mounted or directly mounted via shaft 35 to conventional power take-off device 37 which in turn is connected to a source of power (e.g., truck transmission) 39.

Valve 15 is a three-position, three-way valve having a valve spool 41 whose ends 43a, b extend beyond the valve housing 45. Valve spool 41 is biased by spring means 47 in both directions to normally position valve 15 in its hold (i.e., neutral) position (FIG. 1 and FIG. 4).

Spool end 43a is connected via chamber port 49a to outlet port 51a of air operational valve 53 via air line 55. Spool end 43b is connected via chamber port 49b to outlet port 51b of valve 53 via air line 57.

Operational valve 53 is a three-position, four-way valve having a pair of piston assemblies 61a,b, located in the paths of air flow between inlet port 63, outlet ports 51a,b and exhaust port 65 which vents to atmosphere. Operational valve 53 is actuated by manual handle means 67 discussed more fully hereinafter. Operational valve 53 is connected by line 69 to a source 71 of air under pressure (e.g., the secondary air brake reservoir in a truck air brake system).

In order to protect air reservoir 71 from loss of pressure should an air loss (e.g., a rupture of an air line 55, etc.) occur, safety valve 73 is provided in line 69 between valve 53 and air reservoir 71. Valve 73 is connected directly to air reservoir 71 via inlet port 75 and to line 69 or valve 53 via outlet port 77. Spring 79 pushes against spring cap 80 to normally bias flexible membrane 81 to close off flow between ports 75 and 77 unless a predetermined (e.g., 85 psi) air pressure exists in the line 69.

In order to limit the extent of travel of portion 3 of cyliner 1 and thus the angle of dump of dump body 83 (partially shown in FIG. 9), there is provided between ports 49a and 51a, limit valve 59. Limit valve 59 may be located on a truck or hoist frame member 85 such that the end 87 of limit valve spool 89 which extends beyond valve housing 91 is shifted when cylinder 1 reaches its maximum desired degree of travel.

Limit valve 59 is a two-position, three-way valve having an outlet port 93 connected via line 55 to chamber port 59a, an inlet port 95 connected via line 55' to outlet port 51a of valve 53, and exhaust port 97 vented to atmosphere. Limit valve 59 is normally biased by spring 99 to open a path of air flow between inlet port 95 and outlet port 93.

With particular reference to FIGS. 4–6, hydraulic fluid directional valve 15 is comprised of housing 45 having a series of lands and grooves therein which form paths between inlet port 17, work port 13 and return port 19. Positioned in said paths is hollow directional spool 41 also provided with lands and grooves (i.e., orifices) such that when spool 41 is slidably adjusted in housing 45, three different paths of hydraulic fluid flow (as illustrated in FIGS. 1–3) are created for operation of cylinder 1. FIG. 4 illustrates the valve in its normal spring 47 biased "hold" position as shown in FIG. 1. In this hold position fluid is circulated continuously from port 17 through the valve to port 19 without the use of internal or external removable, temporary inserts or other devices. When moved to the right the spool grooves align ports 17 and 13 while spool lands close off communication between ports 17 and 19, to "raise" cylinder 1. When moved to the left the spool grooves align both ports 17 and 13 with return port 19, thereby lowering cylinder 1.

Spool 41 is moved to the right by pressurizing chamber 101a while venting chamber 101b. Spool 41 is moved to the left by pressurizing chamber 101b while venting chamber 101a. Depressurization of both chambers 101a, b causes bias spring 47 to automatically return spool 41 to its hold position. Actuation to the right or left is managed by free floating pistons 103a,b.

Chamber housings 105a,b totally encase spool ends 43a,b regardless of the position of spool 41. As illustrated in FIG. 5, chamber housings 105a,b are securely sealed in housing 45 by bolts 107a,b. This configuration effectively seals the spool and valve from contamination. This is particularly important in this truck environment since the valve is usually directly connected to pump 37 which, in turn, is conventionally located either on the chassis frame behind the truck cab (not shown) or on the underbelly of the truck below the cab. Pump 37 as illustrated employs a male spline 35a and a male pilot 35b for direct connection to a conventional power take-off, located at the truck transmission on the underbelly of the truck. Spline 35a may be replaced by one or more shafts for remote mounting pump 35 to the rear of the power take-off.

Check valve 31 is biased by spring 32 in a conventional manner and is located in the hollow internal portion of spool 41. The purpose of check valve 31 is to allow fluid flow in one direction only. It is positioned so as to be used in the "raise" position to prevent body 83 from dropping and in the "lower" position to insure the combined flows into ports 13 and 17 to exit through port 19.

Pressure relief valve 33 is used to limit the maximum pressure at which the system will operate. In turn, this prevents the operator from lifting a larger payload than body 83 and hoist 1 is designed to carry.

Figure 7:
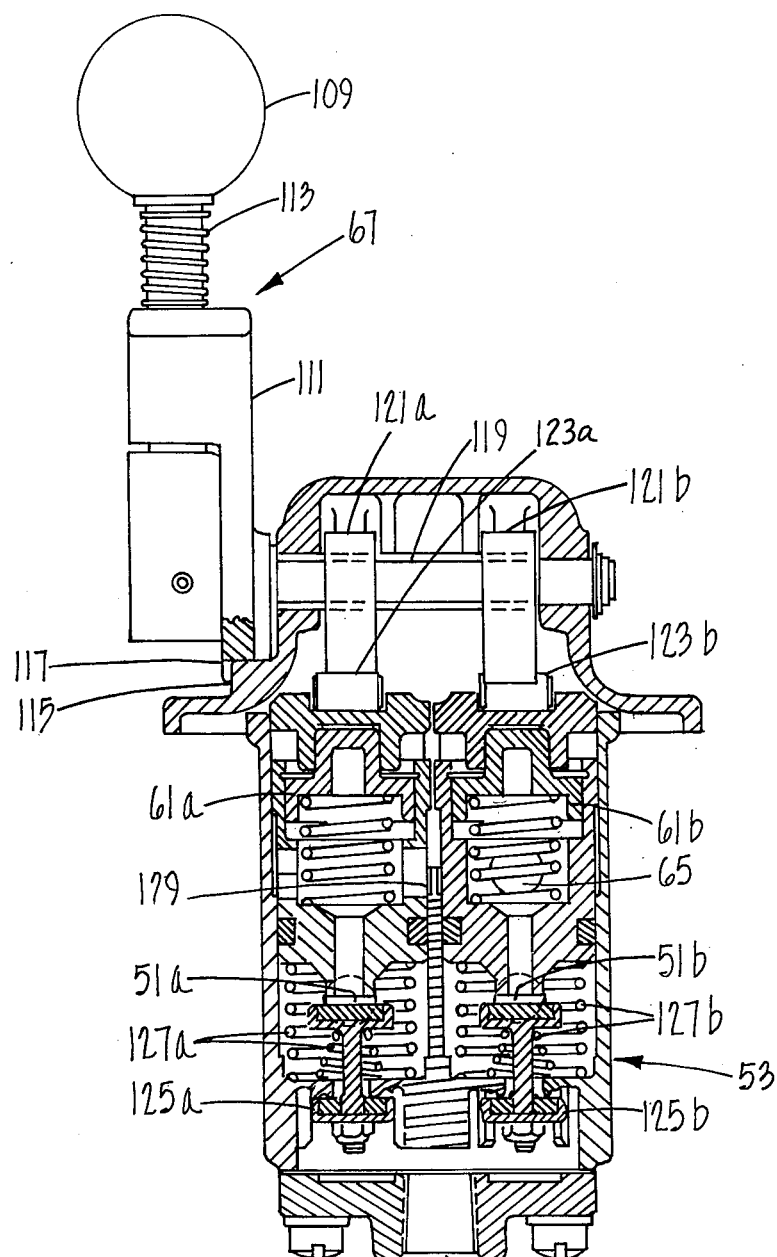
FIG. 7 is a side plan, partially sectionalized view of an operational valve and manual control according to this invention.
Figure 7A:
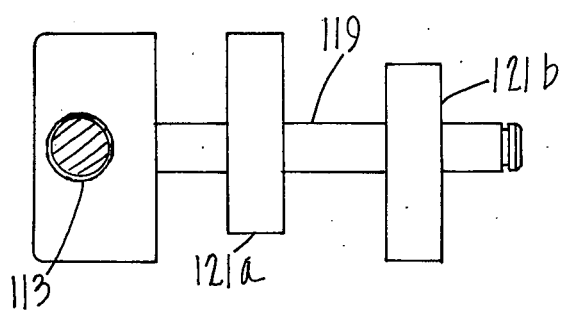
FIG. 7a is a top plan, partially sectionalized view of the cam assemble of FIG. 7.

Handle means 67, i.e., the manual operating means for valve 53, is best illustrated in FIGS. 7–8. Such means 67 include a handle 109, a locking cap 111 normally biased by spring 113 against locking flange 115 via locking detent 117. Handle 109 is connected via shaft 119 to cams 121a,b which upon rotation of shaft 119 are separately brought into contact with cam rollers 123a,b. When a cam 121 contacts its respective roller 123, roller 123 depresses its respective piston assemblies 61 to construct the desired air flow path. In this respect discs 125a,b are spring biased by springs 127a,b to a position which normally closes off air flow between inlet port 63 and the other ports. Wall port 129 with lands and grooves serves to properly communicate the two piston ports. The remaining illustrated springs serve to provide a modulating action, in a known way, of the piston assemblies and discs, which in turn controls the outlet from ports 51a and b.

A spring means (not shown) may be provided to bias the handle 109 to its locked position such that if pressure is removed from the handle when shifted to the "raise" position R or the "lower" position L as illustrated in FIG. 8, the handle automatically returns to the hold position.

It is to be noted that the handle means 67 as illustrated provides a locking mechanism between "raise" and "lower" positions (i.e., at "hold" position between the two) so that one may not inadvertently go from raise to lower, thus creating a dangerous situation.

OPERATION

The operation of the illustrated and above-described system is best shown with reference to FIGS. 1-3. FIG. 1 shows the system in the "hold" (or neutral) position, either with the body at rest on the truck frame, in its maximum raised position through actuation of limit valve 59 or at some intermediate raised position due to selection of such position or a fail-safe condition asserting itself during the raising or lowering operation. Exemplary of such a fail-safe conduction would be if air pressure were lost in one of the air lines causing safety valve 73 to shut off the supply of air from reservoir 71 which in turn would either return or retain the system at "hold".

In the normal operation, starting from the hold position (FIG. 1) with the body at rest and cylinder portion 3 retracted, the body is raised by lifting locking cap 111 against spring bias 113 and shifting handle 109 to the "R" position. This actuates cam 121a which depresses cam roller 123a, actuating piston assembly 61a to move seated disc 125a from its seat, so that inlet port 63 communicates with outlet port 51a and air flows via 51a through limit valve 59 to pressurize chamber 101a, thus actuating free floating piston 103a against spool end 43a. In turn chamber 101b is vented to atmosphere via chamber port 49b, line 57, port 51b and exhaust port 65. Spool 41 shifts to the right aligning inlet port 17 with work port 13 while closing off flow to return port 19. Fluid from reservoir 27 is then pumped via pump 23 through inlet port 17, outlet port 13 to cylinder chamber 5 causing the portion 3 of cylinder 1 to extend, thus lifting dump body 83 and increasing its dumping angle (body 83 being conventionally pivotally connected to the rearmost end of the truck frame).

When the desired limit of travel is reached, spool end 87 of limit switch 59 is contacted and pushed to the right (FIG. 9). This closes off inlet port 95 to outlet port 93 and vents outlet port 93 to atmosphere via exhaust port 97. Since chamber port 49a communicates with outlet port 93, chamber 101a is vented, 101b already having been vented, spring bias 47 returns spool 41 to its hold position as shown in FIG. 1, and the body is held in this position regardless of whether or not the operator continues to hold handle 109 in position "R". In this position, fluid is mandatorily continuously circulated from the reservoir to the valve thus to prevent overheating and seize-up of the valve and pump.

To lower the body, the reverse operation is effected. Handle 109 is unlocked as described and pulled to the "L" position (FIG. 8). Shaft 119 rotates cam 121b into contact with roller 123b depressing piston assembly 61b to unseat disc 125b, thus emitting air flow from inlet port 63 to outlet port 51b. Exhaust port 65 is closed to inlet air flow from port 63, but outlet port 51a is brought into communication therewith via port 129, thus venting chamber 101a. Chamber 101b is pressurized from outlet port 51b via chamber port 49b which actuates free floating piston 103b, contacting spool end 43b and shifting spool 41 to the left. This causes work port 13 and inlet port 17 to communicate with return port 19. The "lower" paths are established as shown in FIG. 3. Hydraulic fluid flows from cylinder chamber 5 to retract the portion 3. Limit spool end 87 is freed and shifts to return limit switch 59 to its first position.

When body 83 is fully lowered to its rest position, handle 109 is shifted to its locked "hold" position, thus operating valve 53 to retract both piston assemblies 61 and reseat both discs 125 to close off flow from inlet port 63 to either outlet port 51a,b. This in turn vents both 51a,b to atmosphere via exhaust port 65. Both chambers 101 are vented and spring bias 47 shifts spool 41 to its hold position, thereby re-establishing the lines of flow as illustrated in FIG. 1.

FIG. 4a illustrates a mechanism for controlling the rate of speed at which body 83 is lowered. This is an important feature since in many instances, for safety, the lowering speed should be rather slow and sensitively controlled. In other instances it may be desired to lower the body rapidly or without speed restriction. The mechanism of FIG. 4a provides for either of these operations. Therein an extended chamber housing 105a is provided with a biasing coil spring 129 which in turn is biased against washer 131. Piston 103a is provided with a teflon guide ring 133 and a cap screw 135. Located between spool end 43a and the contacting end of piston 103a about cap screw 135 are a series of wave springs 137. This mechanism serves to selectively allow or prevent the condition which otherwise would exist wherein after the air pressure required to overcome inertia is exceeded, the spool tends to shoot to its final position for lowering. In a preselected first amount of movement of handle 109 (e.g., 10°), no lowering takes place over a relatively large period of time because there is insufficient air pressure to start the piston 103b moving. When, however, handle 109 is moved an additional preselected arc (e.g., from about 10°-30°) wave springs 137 are compressed and thereafter spring 129 is compressed. This condition allows fluid to flow from port 13 to port 19 at a rate determined by the only partial alignment of the spool and housing grooves. The degree of partial alignment within the 10°-30° art will determine the controlled rate of fall of the body. This in turn allows for a highly controlled lowering of body 83. When, however, handle 109 is initially moved past said arc (e.g., about 30° or more), then full alignment of ports 13 and 19 is achieved for rapid lowering of the body.

While FIG. 4a illustrates a mechanism for controlling the rate of flow in the "lowering" position, it is understood that this mechanism can be provided in chamber 101b by extended chamber housing 105b and making the other necessary adjustments so as to control the rate of flow in the raise position. Similarly, the the mechanism illustrated may be provided at both spool ends thus to control both the raising and lowering operation.

As can be seen from the above, a safe, effective, long lasting and protected mechanism and system is provided for regulating flow between a source of hydraulic fluid and a work station actuated by the flow of such fluid. The system finds particularly advantageous utility in the truck art, and especially in the dump body art.

Once given the above disclosure, many other features, modifications and improvements will become apparent to the skilled artisan. Such features, modifications and improvements are considered a part of this invention, the scope of which is to be determined by the following claims:

I claim:

1. A mechanism for directing the flow of hydraulic fluid between a work station operable by said fluid and a pump for supplying the fluid under pressure from a fluid reservoir to operate said work station, the mechanism comprising:

a first air actuated valve means for selectively directing the flow of hydraulic fluid under pressure in at least two predetermined paths between a fluid pump port, a fluid work station port and a fluid reservoir port, one of said paths directing fluid from the pump port to the work station port while prohibiting flow to said reservoir port and one of said paths directing fluid between the pump port and reservoir port while retaining the work station in a hold position by prohibiting flow of fluid to or from said work station port, said first valve comprising:

a first valve housing having said ports therein, a valve spool capable of being slidably adjusted to a predetermined position within said first valve housing for the selected creation of said fluid flow paths, a piston located external of said valve housing at one end of said spool and engageable with the spool end, a biasing means for normally retaining the spool in a position which creates said path that retains the work station in said hold position, chamber means encasing said piston at the end of said piston opposite that engageable with said spool end and provided with a chamber port means, said valve housing and chamber means cooperating to enclose said piston and said valve spool in all of its positions, and a second valve means for selectively controlling the air actuation of said first valve means, said second valve means comprising a second valve housing having located therein an air inlet port, an air exhaust port and an air outlet port, conduit means for connecting said air outlet port to said chamber port means and means operably located in the flow paths connecting said inlet, exhaust and outlet ports to direct the air in a preselected path thereby to adjust said valve spool to create a desired fluid flow path.

2. A mechanism for directing the flow of hydraulic fluid between a work station operable by said fluid and a pump for supplying the fluid under pressure from a fluid reservoir to operate said work station, the mechanism comprising:

a first air actuated valve means for selectively directing the flow of hydraulic fluid under pressure in at least three predetermined paths between a fluid pump port, a fluid work station port and a fluid reservoir port, one of said paths directing fluid from the pump port to the work station port while prohibiting flow to said reservoir port, one of said paths directing fluid between the pump port and reservoir port while retaining the work station in a hold position by prohibiting flow of fluid to or from said work station port, and one of said paths directing flow of the fluid from said work station and said pump port to said reservoir port, said first valve comprising:

a first valve housing having said ports therein, a first valve spool capable of being slidably adjusted within said first valve housing for the selective creation of said fluid flow paths, a first valve piston located external of said valve housing and located at each end of said spool and engagable with the spool ends, chamber means encasing each of said first valve pistons at the end of said piston opposite that engagable with said spool end and provided with chamber port means for admitting air into and releasing air from said chamber means, biasing means for automatically retaining the first spool in said hold position when air is vented from all chamber means; and a second valve means for selectively controlling the air actuation of said first valve means, said second valve means comprising a second valve housing having located therein a first air inlet port, a first air exhaust port and a pair of first air outlet ports, means for connecting each of said first air outlet ports to a respective chamber port means in said first valve, and means operatively located in the flow paths connecting said first inlet, first exhaust and first outlet ports to direct the flow of air in a selective path between said ports thereby to adjust said first valve spool to a position which creates the desired fluid flow path.

3. A mechanism according to claim 2 which further includes a means for sensing a loss of air pressure in said mechanism and in response thereto shutting off the first air inlet port.

4. A mechanism according to claim 3 wherein said sensing and shut-off means comprises a third valve means which includes a housing having therein a second air inlet port and a second air outlet port, said second air outlet port being in communication with said first air inlet port, and further including a shut-off device located between said second inlet and said second outlet ports.

5. A mechanism according to claim 4 wherein said shutoff device comprises a flexible membrane normally biased to shut off flow between said second inlet and second outlet ports unless the bias is overcome by a predetermined amount of air pressure in said flow path between the two second ports.

6. A mechanism according to claim 2 which further includes a means for controlling the flow rate of fluid from said work station to said reservoir port when said first valve means is positioned to create the path which directs flow of the fluid from said work station port and said pump port to said reservoir port.

7. A mechanism according to claim 5 wherein said piston is located external of said valve housing and said chamber means cooperate with said first vlave housing to enclose said piston and first valve spool at any position to which said spool is slidably adjusted.

8. A mechanism according to claim 2 which further includes a means for sensing a predetermined amount of work performed by said work station and in response thereto actuating said first valve to its hold position.

9. A mechanism according to claim 8 wherein said means for sensing a predetermined amount of work performed by said work station and in response thereto actuating said first valve to its hold position includes a third valve comprising a valve housing having therein a second air inlet port, a second air exhaust port, a second air outlet port, and a second valve spool slidably located within the flow paths of said second ports and having one end extending beyond the extremities of said valve housing for sensing the predetermined amount of work, said second inlet port communicating with one of said first outlet ports of said second valve and said second outlet port communicating with one of the chamber port means of said first valve.

10. The mechanism of claim 9 wherein said second outlet port communicates with the chamber port means of said first valve which upon admission of air will cause said first valve spool to shift to a position which creates a fluid flow path of hydraulic fluid from the pump port to the work station port.

11. The mechanism of claim 10 wherein the second valve spool is capable of creating at least two paths of flow among the second ports, one of said paths allowing air to flow from said second inlet port to said second outlet port while prohibiting flow to said second exhaust port and one of said paths allowing air to flow from said second outlet port to said second exhaust port while prohibiting flow into said third valve from said second inlet port.

12. The mechanism of claim 11 wherein said second valve spool is normally biased to a position at which its said end extends to its farthestmost limit beyond the extremities of said valve housing at which there is created the path of air flow which allows air to flow from said second inlet port to said second outlet port while prohibiting flow to said second exhaust port.

13. A mechanism according to claim 12 wherein said work station is a hydraulic hoist and wherein said mechanism further includes means for retaining said third valve in association with said hoist at a position so as to sense the desired limit of extension of said hoist and in response thereto actuate said first valve to its hold position whereby said hoist is held at the position sensed.

14. A mechanism according to claim 13 wherein said retaining means positions said third valve such that at the desired limit of extension of said hoist, said hoist contacts the said end of the third valve spool and shifts it to a position which creates a path of air flow from the second air outlet port to the second exhaust port, thereby exhausting the chamber port means of said first valve and shifting said first valve spool to its normal hold position.

15. A mechanism according to claim 14 which further includes a means for sensing a loss of air pressure in said mechanism and in response thereto shutting off the first air inlet port of said second valve.

16. A mechanism according to claim 15 wherein said sensing and shut-off means comprises a fourth valve means which includes a housing having therein a third air inlet port and a third air outlet port, said third air inlet port being in communication with said first air inlet port and further including a shut-off device located between said third inlet port and said third outlet port.

17. A mechanism according to claim 16 wherein said shut-off device comprises a flexible membrane normally biased to shut off flow between said third inlet port and said third outlet port unless the bias is overcome by a predetermined amount of air pressure in said flow path between the third inlet port and the third outlet port.

18. A mechanism according to claim 17 which further includes a source of air under sufficient pressure to overcome the loss, and which further includes means for controlling the flow rate of fluid from said work station to said reservoir port when said first valve means is positioned to create the path which directs flow of the fluid from said work station port and said pump port to said reservoir port, said means being located within the said chamber port means of said first valve which upon admission of air will cause said first valve spool to shift to a position which creates a fluid flow path of hydraulic fluid from the pump port to the work station port.

19. A mechanism according to claim 18 wherein said source of air is the air system of a truck brake mechanism, said air system being directly connected to said second inlet port.

20. A mechanism according to claim 8 which further includes manually operable means for adjusting the means operatively located in the flow paths connecting said first inlet, first exhaust and first outlet ports to a position which achieves the desired selected path of air flow between said ports.

21. A mechanism according to claim 2 which further includes a manually operable means for adjusting the means operatively located in the flow paths connecting said first inlet, first exhaust and first outlet ports to a position which achieves the desired selected path of air flow between said ports.

22. A mechanism according to claim 21 wherein said second valve further includes a pair of spring-biased second valve pistons, one of said second pistons being located in the air flow path between the first air inlet port and one of said pair of first air outlet ports and the other of said second pistons being located in the air flow path between the first air inlet port and the other of said pair of first air outlet ports, said second valve pistons being normally biased to close off the flow of air between the first air inlet port and its respective first air outlet port and to open a path of air flow between said first exhaust port and its respective first air outlet port, and wherein said manually operable means includes a cam means for selectively depressing one or the other of said second pistons against its spring bias, a rotatable shaft associated with said cam means and a handle means for rotating said shaft thereby to selectively depress one or the other of said second pistons.

23. A mechanism according to claim 22 wherein said handle means includes a means for locking said shaft so as to retain said second valve pistons in their normally biased position, and means for unlocking said handle thereby to allow said handle to be operated to rotate said shaft.

24. A mechanism according to claim 23 wherein said locking and unlocking means includes a spring biased latch means normally biased to a locking position and located in its unlocking position only upon application of pressure against said spring bias.

25. The mechanism of claim 24 being included in a system for operating a work station by the flow of hydraulic fluid to and from said work station, the system comprising a source of pressurized hydraulic fluid, a reservoir for said hydraulic fluid, and said mechanism operably located between said source and said reservoir.

26. A mechanism according to claim 2 wherein said first valve further includes a means for sensing a fluid pressure in the system in excess of a predetermined amount and eliminating said excess in response thereto.

27. A mechanism according to claim 25 wherein said first valve further includes a check valve means associated with said first valve spool and located in the path of fluid flow between said fluid pump port and said fluid work station port and biased in a direction to normally shut off flow between said pump and work ports until said bias is overcome by a predetermined amount of fluid pressure.

28. The mechanism of claim 1 being included in a system for operating a work station by the flow of hydraulic fluid to and from said work station, the system comprising a source of pressurized hydraulic fluid, a reservoir for said hydraulic fluid, and said mechanism operably located between said source and said reservoir.

29. The mechanism of claim 2 being included in a system for operating a work station by the flow of hydraulic fluid to and from said work station, the system comprising a hydraulic fluid, pump integrally attached to said first valve housing a reservoir for said hydraulic fluid, and said mechanism operably located between said pump and said reservoir, and wherein when said valve means creates a path of flow which directs fluid between the pump port and reservoir port while retaining the work station in a hold position by prohibiting flow of fluid to or from said work station port, there is provided a continuous circulation of fluid from reservoir to pump to valve means and back to reservoir by said valve means construction without the addition of temporary attachments, inserts or lines.

30. A system for operating a work station by the flow of hydraulic fluid to and from said work station, the system comprising a source of pressurized air, a source of pressurized hydraulic fluid, a reservoir for the fluid and means for directing the flow of fluid in a given path thereby to operate said work station, said means comprising an air actuated directional valve for said fluid, an operational valve for directing air in predetermined paths from said source of pressurized air to said directional valve for actuating said directional valve, and means for actuating said operational valve, said directional valve comprising a valve housing having therein an inlet fluid port in communication with said source of pressurized fluid, a work station fluid port in communication with said work station, and an outlet fluid port in communication with said reservoir, said housing being provided with housing lands and grooves, a directional valve spool provided with spool lands and grooves and slidably located within said valve housing and in association with said housing lands and grooves such that said spool may be slidably adjusted within said housing thereby to selectively align said lands and grooves to create at least two distinct paths of fluid flow within said housing ports including a first fluid flow path directing fluid from the inlet fluid port to the work station fluid port while prohibiting flow to said reservoir fluid port, and a second fluid path directing fluid between the inlet fluid port and reservoir fluid port while prohibiting fluid from flowing to or from said work station fluid port, a chamber attached to said directional valve housing and having therein a free floating piston engagable with an end of said spool, said chamber having a chamber port located at the end of the chamber adjacent the end of said piston opposite the piston end engagable with said spool end, said chamber and housing cooperating to fully encase said spool and said piston in an operating position against external contamination, and biasing means which normally biases said spool in a position such that said lands and grooves form the said path which directs fluid between the inlet port and reservoir port while prohibiting fluid from flowing to or from said work station port;

said operational valve including an inlet air port, an outlet air port and an exhaust air port, said outlet air port communicating with the chamber port of said directional valve, said inlet air port communicating with said source of pressurized air and said exhaust air port venting to atmosphere, and further including means for establishing at least two paths of flow of air between said ports, one of said paths permitting pressurized air to flow from the inlet air port via the outlet air port to the said chamber port, and one of said paths permitting air to flow from said chamber port via said outlet air port and said exhaust air port to atmosphere while prohibiting air flow from said inlet air port to said outlet air port.

31. A system according to claim 30 wherein said directional valve spool is slidably adjustable within said housing thereby to selectively align said lands and grooves to create at least three distinct paths of fluid flow between said housing ports, include the third fluid flow path directing fluid from said work station port and said inlet fluid port to said outlet fluid port and wherein said directional valve spool extends through the valve housing and has located at both ends a said chamber and piston, each of said chambers having a said chamber port;

said operational valve including first and second outlet air ports, each outlet air port being in communication with a respective one of said chamber ports and wherein said means for establishing paths of air flow through said operational valve is a means for establishing at least three paths of air flow including a first air flow path establishing a flow of air from said inlet air port to said first outlet air port while establishing a flow of air from the second outlet air port to said exhaust air port and prohibiting flow of air from said inlet air port to said second outlet air port, a second air flow path establishing a flow of air from both of said first and second outlet air ports to said exhaust air port while prohibiting flow of air from said inlet air port to either of said outlet air ports, and a third air flow path establishing a flow of air from said inlet air port to said second outlet air port while establishing a flow of air from said first outlet air port to said exhaust air port while prohibiting the flow of air from the inlet air port to said first outlet air port.

32. A system according to claim 31 wherein said operational valve includes means for normally biasing said means for establishing said three paths of air flow through said operational valve, to assume a position which establishes said second air flow path, said operational valve being so connected with said directional valve that when said operational valve means assumes said first air flow path position, it actuates said spool of the directional valve to a position which establishes said first fluid flow path in said directional valve and when said operational valve means assumes said second air flow path position it actuates said spool of said directional valve to a position which establishes said second fluid flow path in said directional valve and when said operational valve means assumes said third air flow path position it actuates said spool of said directional valve to a position which establishes said third fluid flow path in said directional valve.

33. A system according to claim 32 wherein said handle means includes a means for locking said shaft so as to retain said piston assemblies in their normal biased position and means for unlocking said handle thereby to allow said handle to be operated to rotate said shaft.

34. A system according to claim 33 which further includes a safety valve means located between said source of pressurized air and said operational valve, said safety valve including a means for shutting off the flow of air from said source if the pressure in the inlet air port of said operational valve drops below a predetermined minimum thereby causing said operational valve and said directional valve to automatically assume their second flow path positions to hold the work station at its then occurring position.

35. A system according to claim 34 which further includes means for limiting the extent of travel of said work station, said means including a limit valve provided with a limit outlet port, a limit inlet port, a limit exhaust port and means for establishing at least two paths of flow within said limit ports, including a first path establishing a flow of air between said limit inlet port and said limit outlet port while prohibiting flow to said limit exhaust port, and a second path establishing a flow of air between said limit outlet port and said limit exhaust port, said limit inlet port being connected to said first outlet air port to said operational valve and said limit outlet port being connected to the said respective one of said chamber ports thus connecting said first outlet air port to its respective chamber port, said means for establishing said two paths of flow comprising means for sensing the desired extent of travel of said work station and in response thereto establishing said second path of air flow within said limit valve.

36. The mechanism of claim 1 being included in a truck assembly comprised of an engine, an engine transmission, a power take-off device connected to said transmission, a hydraulic fluid pump powered by said power take-off device, a reservoir tank for retaining hydraulic fluid, a source of air under pressure, a work station to be operated by hydraulic fluid from said pump and wherein said mechanism is operably located between said pump, reservoir and work station to direct the flow of hydraulic fluid therebetween in said predetermined paths.

37. The mechanism of claim 2 being included in a truck assembly comprised of an engine, an engine transmission, a power take-off device connected to said transmission, a hydraulic fluid pump powered by said power take-off device, a reservoir tank for retaining a hydraulic fluid, a source of air under pressure, a work station to be operated by hydraulic fluid from said pump and wherein said mechanism is operably located between said pump, reservoir and work station to direct the flow of hydraulic fluid therebetween in said predetermined paths.

38. The mechanism of claim 37 wherein said hydraulic pump is attached directly to said power take-off device, said means for sensing a loss of air pressure is connected directly to the source of air under pressure and said third valve means is positioned in association with said cylinder such that said cylinder contacts and slides the end of said third valve at a point just prior to the maximum travel point of said cylinder.

39. The mechanism of claim 38 wherein said cylinder is connected to a truck dump body in a manner capable of raising and lowering said body by operation of said mechanism.

40. The system of claim 30 being included in a truck assembly comprised of a source of power, a work station to be operated by said source of power and wherein said system is operatively connected to said work station and source of power thereby to transmit power, from said source of power to said work station thereby to operate said work station and perform the intended work therewith.

41. A system according to claim 32 which further includes a means for limiting the extent of travel of said work station.

42. A system according to claim 41 wherein said limiting means includes a limit valve provided with a limit outlet port, a limit inlet port, a limit exhaust port and means for establishing at least two paths of flow within said limit ports, including a first path establishing a flow of air between said limit inlet port and said limit outlet port while prohibiting flow to said limit exhaust port, and a second path establishing a flow of air between said limit outlet port and said limit exhaust port, said limit inlet port being connected to said first outlet air port of said operational valve and said limit outlet port being connected to the said respective one of said chamber ports thus connecting said first outlet air port to its respective chamber port.

43. A system according to claim 42 wherein said means for establishing said paths of flow within said limit ports includes means for sensing the desired extent of travel of said work station and in response thereto establishing said second path of air flow within said limit valve.

44. A system according to claim 43 wherein said limit valve further includes means for normally biasing said path establishing means to a position which creates said first path of air flow within said limit valve.

45. A system according to claim 32 wherein said operational valve comprises a pair of spring-biased piston assemblies, one of said assemblies being located in the air flow path between the inlet air port and said first outlet air port and the other of said assemblies being located in the air flow path between the inlet air port and said second outlet air port, both of said assemblies being located in the air flow path between their respective outlet air ports and said exhaust air port, said assemblies being normally biased to close off the flow of air between the inlet air port and said outlet air ports and to create a flow of air between the air outlet ports and said exhaust air port, and wherein said means for actuating said operational valve includes a cam means for selectively depressing one or the other of said piston assemblies against its spring bias, a rotatable shaft associated with said cam means and a handle means for rotating said shaft thereby to selectively depress said piston assemblies.

46. The system of claim 40 which further includes a power take-off device for transmitting the power from said source of power to operate the source of pressurized hydraulic fluid, said source of pressurized fluid including a pump means for pumping hydraulic fluid from said reservoir through said directional valve to said work station.

47. The system of claim 57 being included in a truck assembly comprised of a source of power, a work station to be operated by said source of power wherein said system is operatively connected to said work station and source of power thereby to transmit power from said source of power to said work station thereby to operate said work station and perform the intended work therewith.

48. The system according to claim 47 wherein said work station is a hydraulically operated telescoping cylinder, one side of which is in communication with said work station fluid port of said directional valve.

49. The system according to claim 48 wherein said work station of said truck comprises a hydraulically operated cylinder hoist means connected to a dump body, said hoist means being operable by travel of said cylinder to pivot said dump body about a point of connection to said truck thereby to raise the body to a dump position and lower said body to a rest position, the first fluid flow path operating to raise said body, the second fluid flow path operating to hold said body against further motion, and the third fluid flow path operating to lower said body from a raised position.

50. The system of claim 35 being included in a truck assembly comprised of an air brake system, a source of power, a work station to be operated by said source of power and wherein said system is operatively connected to said work station and source of power thereby to transmit power from said source of power to said work station thereby to operate said work station and perform the intended work therewith.

51. The system according to claim 50 wherein said work station comprises a telescoping hydraulic cylinder.

52. The system according to claim 51 wherein said truck further includes a driver's cab and said handle means is located in said cab.

53. The system according to claim 52 wherein said source of air under pressure is said air brake mechanism, said work station further includes a hoist operated by said hydraulic cylinder, and a dump body operated by said hoist, said hoist being operable by travel of said cylinder to pivot said dump body about a point of connection to said truck thereby to raise the body to a dump position and lower said body to a rest position, the first fluid flow path operating to raise said body, the second fluid flow path operating to hold said body against further motion, and the third fluid flow path operating to lower said body from a raised position, said safety valve means being connected directly to said air brake system, said limit valve being located at a point proximal the point of maximum desired travel of said hydraulic cylinder, said sensing means being the only means provided for sensing the extent of travel by said cylinder.

54. The mechanism of claim 37 which further includes a means for sensing a loss of air pressure in said mechanism and in response thereto shutting off the first air inlet port.

55. The mechanism of claim 54 which further includes a means for sensing a predetermined amount of work performed by said work station and in response thereto actuating said first valve to its hold position, said sensing means including a third valve comprising a valve housing having therein a second air inlet port, a second air exhaust port, a second air outlet port, and a second valve spool slidably located within the flow paths of said second ports and having one end extending beyond the extremities of said valve housing to a point proximal with the point at which said work station will have performed its predetermined amount of work, said end being capable of contacting said work station thereby to slidably adjust said second valve spool when the said amount of work is performed to a position which causes said second air exhaust port to communicate with said second air outlet port thereby to shift said first valve to its hold position.

56. The mechanism of claim 55 wherein said work station includes a telescoping hydraulic cylinder and the fluid work station port of said first valve is connected to one side of said cylinder.

57. A system according to claim 44 which further includes a safety valve means located between said source of pressurized air and said operational valve, said safety valve including a means for shutting off the flow of air from said source if the pressure in the inlet air port of said operational valve drops below a predetermined minimum, thereby causing said operational valve and said directional valve to automatically assume their second flow path positions to hold the work station at its then occurring position.

58. A system according to claim 57 wherein said work station is a hydraulically operated telescoping cylinder, one side of which is in communication with said work station fluid port of said directional valve.

59. A system according to claim 58 wherein said source of pressurized hydraulic fluid includes a hydraulic pump means for drawing fluid from said reservoir and pumping it under pressure to said directional valve.

60. A system according to claim 59 wherein said pump means is directly mountable to a power take-off device.

61. A mechanism for directing the flow of hydraulic fluid to and from a work station, the mechanism comprising
an air actuated directional valve for said fluid, said valve including: a valve housing having therein an inlet fluid port, a work station port and an outlet fluid port, and a series of interconnected housing land and groove means for interconnecting said ports and providing in said housing a spool orifice which extends through said housing, and
a direction valve spool adjustably located in said spool orifice and having its ends extend beyond the extremities of the housing, said spool being provided with spool land and groove means which cooperate with said housing land and groove means to selectively align respective lands and grooves to create distinct paths of fluid flow between said housing ports, wherein said distinct paths include a first fluid flow path directing fluid from the inlet fluid port to the work station fluid port while prohibiting flow to said reservoir port, a second fluid path directing fluid between the inlet fluid port and reservoir fluid port while prohibiting fluid from flowing to or from said work station port, and a third fluid path directing fluid from said work station part and inlet fluid port to said outlet fluid port;

means for air actuating said spool to a position which creates a selected distinct path, said means comprising a chamber means located at each spool end, pressure transmitting means in said chamber means and an air pressure regulating valve in communication with said chamber means to control the pressure applied to said pressure transmitting means so that the valve spool is maintained in one of a selected plurality of positions and thus control the fluid flow rate at said workstation port, each of said chamber means being attached to said valve housing so as to cooperate with said valve housing to encase said spool against contamination in all of said spool's operating positions; and biasing means for normally retaining said spool in a position such that at said position said respective lands and grooves cooperate to prevent the flow of hydraulic fluid to and from the work station, said biasing means including a coil spring located in at least one of said chamber means and operatively connected to the end of said spool within said chamber means.

* * * * *

UNITED STATES PATENT AND TRADEMARK OFFICE
CERTIFICATE OF CORRECTION

PATENT NO. : 4,182,534
DATED : January 8, 1980
INVENTOR(S) : David M. Snyder

It is certified that error appears in the above-identified patent and that said Letters Patent are hereby corrected as shown below:

On the title page, column 1, insert the following:

[73] Muncie Parts Mfg. Co., Inc., Muncie, Indiana

Signed and Sealed this

Twenty-fifth Day of March 1980

[SEAL]

Attest:

SIDNEY A. DIAMOND

Attesting Officer

Commissioner of Patents and Trademarks